United States Patent [19]
Prager

[11] Patent Number: 5,875,104
[45] Date of Patent: *Feb. 23, 1999

[54] OPERATING SWITCHING POWER CONVERTERS IN A PHASED POWER SHARING ARRAY

[75] Inventor: Jay Prager, Tyngsboro, Mass.

[73] Assignee: VLT Corporation, San Antonio, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 883,055

[22] Filed: Jun. 26, 1997

[51] Int. Cl.⁶ ................................................. H02M 11/00
[52] U.S. Cl. .............................................................. 363/65
[58] Field of Search ................................ 363/65, 67, 69, 363/71

[56] References Cited

U.S. PATENT DOCUMENTS

| | | | |
|---|---|---|---|
| 4,415,959 | 11/1983 | Vinciarelli | 363/21 |
| 4,648,020 | 3/1987 | Vinciarelli | 363/71 |
| 5,079,686 | 1/1992 | Vinciarelli | 363/65 |
| 5,548,504 | 8/1996 | Takehara | 363/65 |
| 5,682,303 | 10/1997 | Goad | 363/71 |
| 5,694,309 | 12/1997 | Prager et al. | 363/65 |
| 5,740,023 | 4/1998 | Brooke et al. | 363/65 |

OTHER PUBLICATIONS

Video tape copy of segment from Vicor Corporation Annual Meeting of Shareholders, Andover, Mass., Jun. 27, 1996.

*Primary Examiner*—Matthew Nguyen
*Attorney, Agent, or Firm*—Fish & Richardson P.C.

[57] ABSTRACT

A method and apparatus for operating quantized power converters in a phase staggered power sharing array is disclosed. The number, N, of active converters in the array is automatically determined. The converter operating at the highest frequency is determined and awarded driver status. The system operating frequency is set to approximately N times the highest converter operating frequency and synchronous phase staggered timing signals are sent to the remaining converters. A method and apparatus for detecting faults and automatically reconfiguring the array are disclosed.

18 Claims, 14 Drawing Sheets

CURRENT CONTROLLED OSCILLATOR DIAGRAM

SAMPLER DIAGRAM

DIVIDER DIAGRAM

DIRECT CONNECTION
(IF N > 3, USE EXTERNAL REGULATOR)

LIMITED DESTRUCTION
(IF N > 3, USE EXTERNAL REGULATOR)

FAULT TOLERANT
(MUST HAVE EXTERNAL REGULATOR)

OPERATING SWITCHING POWER CONVERTERS IN A PHASED POWER SHARING ARRAY

BACKGROUND OF THE INVENTION

This invention relates to operating switching power converters in a phased power sharing array. Recently, power converter modules which convert power from an input voltage source for delivery to a load have become popular. One type of converter module is a quantized converter in which the amount of energy transferred from the source to the load during each converter operating cycle is finite and bounded within relatively narrow limits. Such converters adjust to changes in line and load conditions by changing their operating frequency. See "Forward Current Switching at Zero Current," U.S. Pat. No. 4,415,959, incorporated here by reference, for a more detailed discussion of quantized zero-current switching converters.

In certain quantized converters, such as half-wave zero-current switching converters, output power varies predictably with switching frequency. Power sharing between converters in an array therefore may be achieved by synchronizing the switching frequencies of the converters. Power-sharing converter arrays allow for delivery of higher power levels to a load than is possible with a single converter. See "Power Booster Switching at Zero Current", U.S. Pat. No. 4,648,020; "Enhancement-Mode Zero Current Switching Converter", U.S. Pat. No. 5,079,686; and "Synchronization of Power Converter Arrays," U.S. patent application Ser. No. 08/631,890, filed Apr. 16, 1996; all of which are incorporated here by reference, for additional background information concerning power-sharing converter arrays.

SUMMARY OF THE INVENTION

In one general aspect of the invention, a method of operating power converters in a power sharing array includes receiving driver pulses from the converters, determining the number, N, of converters in the array, determining which one converter in the array is operating at the highest frequency (denoted the driver converter) and awarding booster status to all of the other converters in the array. Internal timing signals having a frequency of approximately N times the frequency of driver pulses and synchronization signals for the booster converters are generated such that the booster converters are phase-staggered and synchronized with respect to the driver converter.

Preferred embodiments may include the following additional features.

The determining the number process may be carried out periodically to detect changes in the number N of converters in the array.

The determining which one converter process may be carried out periodically to allow the converters to change between driver and booster status.

The synchronization signals may be monitored to ensure that a predetermined number of signals are produced per booster converter per operating cycle.

In another general aspect, the invention includes a control circuit for controlling power converters connected in a load sharing array. A timing circuit has inputs connected to receive converter operating cycle information from the converters. A status circuit has inputs connected to receive status signals from the converters and an output connected to the timing circuit for providing a tally of converters meeting predetermined criteria. Output circuitry is connected to the timing circuitry for sending synchronizing signals to the converters. The control circuitry automatically determines the number, N, of converters in the array, and generates synchronizing signals for operating the converters in a phase-staggered synchronized array.

Preferred embodiments may include one or more of the following features.

The timing circuit may determine the highest frequency of the converter operating cycles and generates a signal having a frequency approximately N times the highest frequency.

The status circuit may detect predetermined fault conditions and generate a signal to logically remove one or more of the converters from the phased-staggered synchronous array.

The status circuit may ensure that a predetermined number of booster pulses are produced per booster per operating cycle.

The status circuit may automatically adjust the number, N, of converters in response to one or more of the converters being logically removed from the array.

The timing circuit may receive driver pulses from the converters, determine which one of the converters is operating at the highest frequency, award driver status to the one converter, and award booster status to the remaining converters in the array.

The control circuit may operate at a system frequency of approximately N times the frequency of driver pulses from the converters.

In another general aspect, the invention includes a power-sharing converter-array including a plurality of quantized switching power converters having inputs connected to a power source and outputs connected to a load and a control circuit for controlling the power converters. A timing circuit has inputs connected to receive converter operating cycle information from the converters. A status circuit has inputs connected to receive status signals from the converters and an output connected to the timing circuit for providing a tally of converters meeting predetermined criteria. Output circuitry is connected to the timing circuitry for sending synchronizing signals to the converters. The control circuitry automatically determines the number, N, of converters in the array, and generates synchronizing signals for operating the converters in a phase-staggered synchronized array.

Preferred embodiments may include one or more of the following features.

The timing circuit may determine the highest frequency of the converter operating cycles and generates a signal having a frequency approximately N times the highest frequency.

The status circuit may detect predetermined fault conditions and generate a signal to logically remove one or more of the converters from the phased-staggered synchronous array.

The status circuit may ensure that a predetermined number of booster pulses are produced per booster per operating cycle.

The status circuit may automatically adjust the number, N, of converters in response to one or more of the converters being logically removed from the array.

The timing circuit may receive driver pulses from the converters, determine which one of the converters is operating at the highest frequency, award driver status to the one converter, and award booster status to the remaining converters in the array.

The control circuit may operate at a system frequency of approximately N times the frequency of driver pulses from the converters.

Among the advantages of the invention are one or more of the following: Reduction in input and output ripple voltage at the system operating frequency. The quanta of charged removed from the input source per power pulse is reduced by a factor of N. System frequency increase by a factor of N allowing reductions in filter size and cost. Automatically configures and reconfigures to changing line and load conditions. The controller is scalable. For example, when power from the PC line of the converters is used, the supply current available to the controller is proportional to the number of converters. Benefits may be achieved without degrading fault tolerance. Other advantages and features of the invention will become apparent from the following description and from the claims.

DESCRIPTION OF THE PREFERRED EMBODIMENTS

Figure 1:
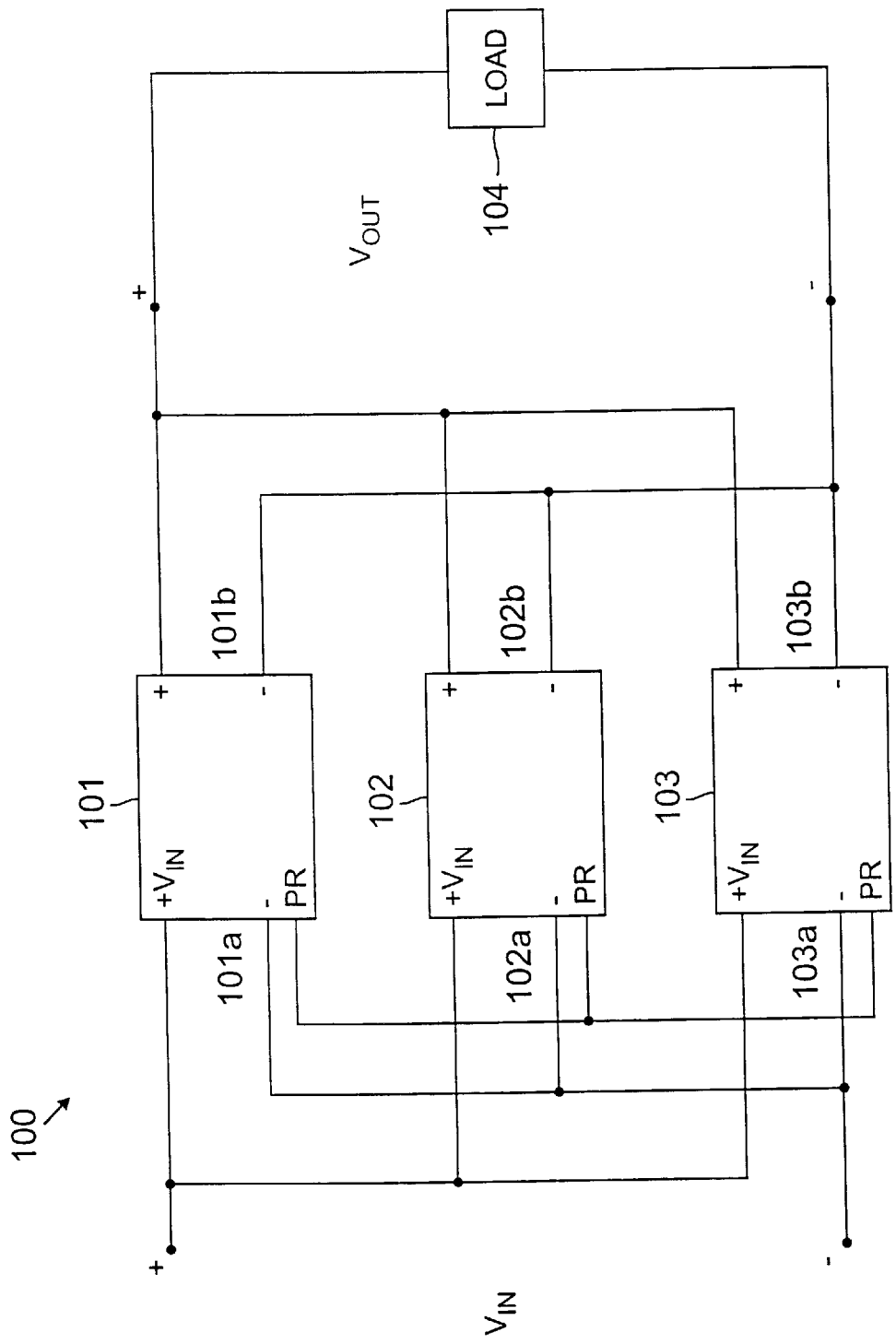
FIG. 1 is a schematic block diagram of a power sharing array of power converters.

In FIG. 1, converters 101, 102, and 103 each have their respective inputs 101a, 102a, and 103a connected to a power source Vin. Each converter 101, 102, and 103 will alter its operating frequency depending on the line and load conditions. The respective outputs 101b, 102b, 103b are connected in parallel to load 104 thus allowing the converters to share in supplying the load 104 with power.

In FIG. 1, each converter module has a PR terminal for connection in a power sharing array. The PR terminals of all of the converter modules in the array are connected together. A converter outputs a PR pulse on its PR terminal when the converter itself initiates a conversion cycle. A converter is forced to initiate a conversion cycle when it receives a PR pulse on its PR terminal. Thus by connecting all of the PR terminals together, this PR pulse handshaking may be used, as shown in FIG. 1, to synchronize all of the converters in the array such that all converters share equally in delivering power to the load. The converter operating at the highest frequency will assume the role of the driver supplying PR pulses to the remaining converters in the array. The PR pulses will then control all of the other converters in the array such that they will all produce conversion cycles at the same time.

Figure 2:
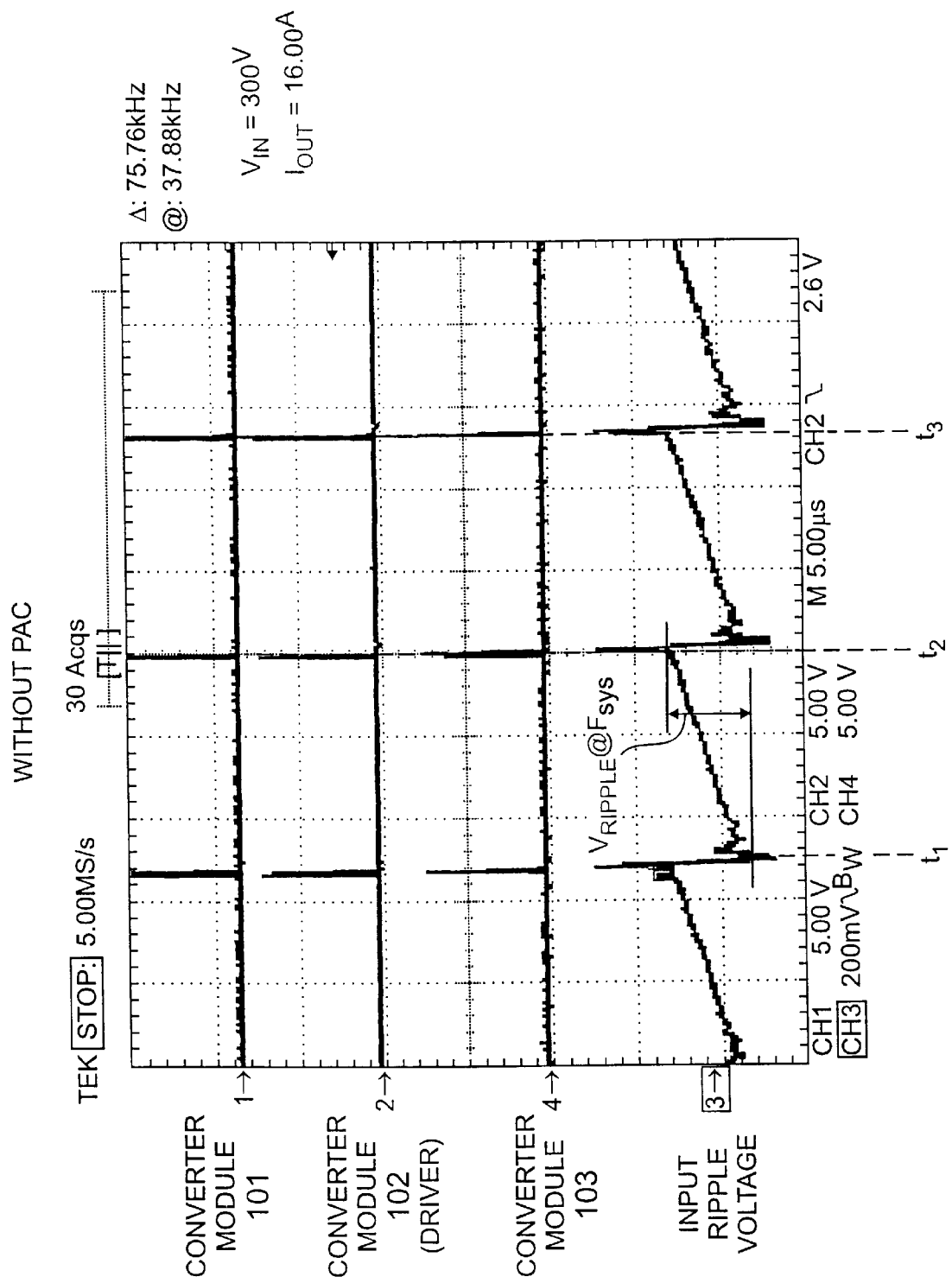
FIG. 2 shows various waveforms for a three converter power sharing array operating without phase control.

As seen in FIG. 2, waveforms 1, 2, and 4 represent the individual converter operating cycles for converter modules 101, 102, and 103 respectively. All three converters are operating at the same operating frequency, Fop, of approximately 76 KHz. All converters initiate conversion cycles at the same times as shown by the coincident pulses at times t1, t2, and t3. Converter 102 is the driver converter while converters 101 and 103 are the booster converters. This means that converter 102 operates at a slightly higher frequency than converters 101 and 103 under these line and load conditions. Converter 102 therefore forces converters 101 and 103 to initiate conversion cycles using the PR handshaking. Waveform 3 in FIG. 1 shows the ripple voltage at the input to the three converters. As can be seen from waveform 3, a relatively large drop in the input voltage occurs at the time of the three coincident conversion cycles of the three converters 101, 102, 103. The peak-to-peak magnitude of the component of the ripple occurring at the system operating frequency, Fsys, is approximately 200 millivolts and the system operating frequency, Fsys, is the same as the converter operating frequency, Fop, approximately 76 KHz.

Figure 3:
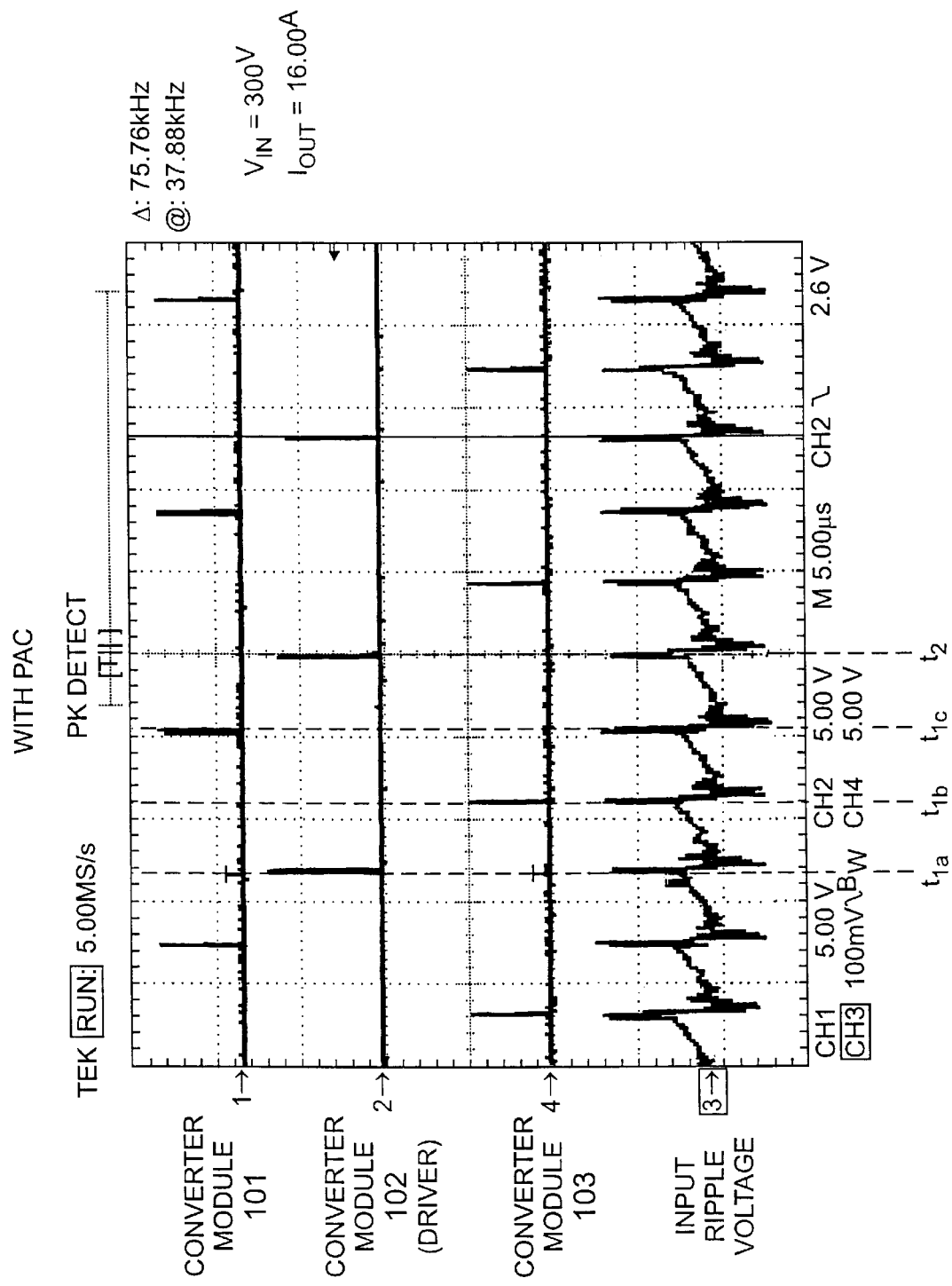
FIG. 3 shows various waveforms for a three converter power sharing array operating with phase control.
Figure 4:
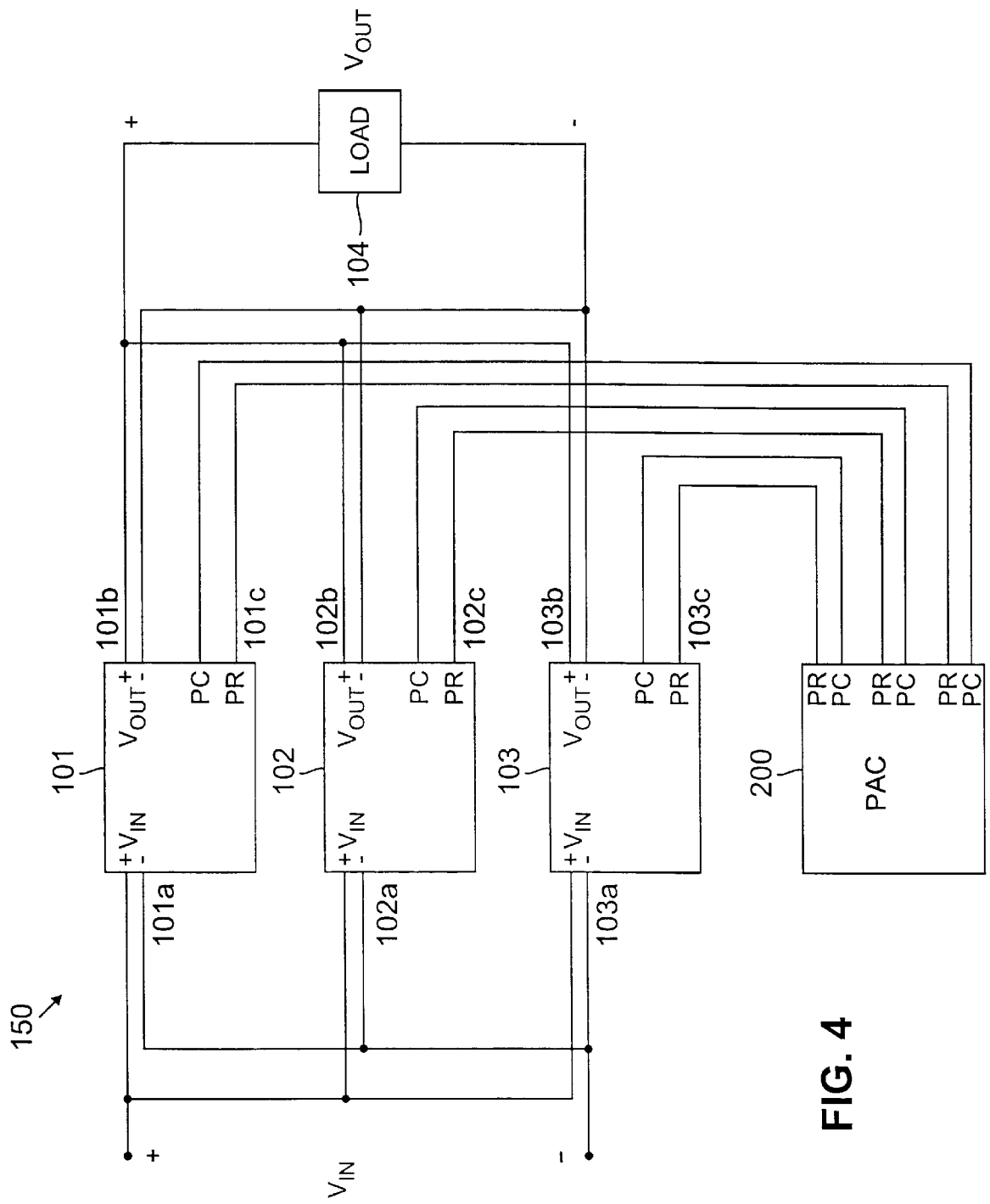
FIG. 4 is a schematic block diagram of a phased three converter array.

The same three converters connected in a phased power sharing array in accordance with the present invention are shown in FIG. 4 and waveforms for the same input and load conditions are shown in FIG. 3. As can be seen, each of the three converters is still operating at the same frequency, Fop, of approximately 76 KHz, however, the respective conversion cycles are phase staggered equally throughout the operating cycle. Waveform 2, corresponding to the driver converter 102, was chosen as the start of the converter period. At time t1a, driver converter 102 initiates a conversion cycle as shown by the pulse on waveform 2. Similarly, at times t1b and t1c, booster converters 101 and 103, controlled via the PR handshaking, initiate their respective conversion cycles as indicated by waveforms 1 and 4, respectively. The cycle repeats at time t2. It should be noted that the driver module may change its operating frequency at any time to accommodate changing line and load conditions and the controller will adjust appropriately. Similarly, the controller will adjust automatically to changes in drivership among the converters.

One significant difference between the array of FIG. 1 and the phased array shown in FIG. 4 is that the phased array system appears externally to be operating at a much higher fundamental frequency. For example, the frequency of the ripple across the input source corresponding to the system frequency, Fsys, increases by a factor of N for a converter array having N converters. In other words, Fsys=N*Fop in the phased array compared to Fsys=Fop in the array of FIG. 1. In the three converter example of FIG. 2, the apparent or system operating frequency, Fsys, increases by a factor of three. Another significant difference is that the magnitude of the ripple component, Vripple, presented to the input source by the array at the system operating frequency, Fsys, decreases by approximately the same factor, N. Thus, the ripple of the array of FIG. 1 is approximately N times greater than the ripple of the phased array.

The phased array thus avoids a single, large delivery of energy at the fundamental converter operating frequency and raises the effective system switching frequency. The advantages include raising the ripple frequency which allows for a reduction in the input filter size and cost. The magnitude of the ripple at the system frequency, Fsys, presented to the input source is also reduced. The phased array may also achieve a reduction in magnitude of the output ripple and the output filter requirements.

Referring to FIG. 4, a phased array controller "PAC" 200 is shown connected to the control ports 101c, 102c, 103c of each of the three converter modules 101, 102, 103. A converter module has a PR and a PC terminal for connection in a power sharing array as described above. For clarity, the PR pulse output by a driver converter when it initiates a conversion cycle will be called a "driver pulse" and a pulse which is input to a booster converter to initiate a conversion cycle will be called a "mono pulse." This driver pulse and mono pulse handshaking is used by the controller 200 to synchronize and phase stagger the conversion cycles in the converters. Each converter provides a constant 6 Volt level on its PC terminal when it is operating properly. The PC line may be externally pulled low by the controller 200 to disable the converter.

Figure 5:
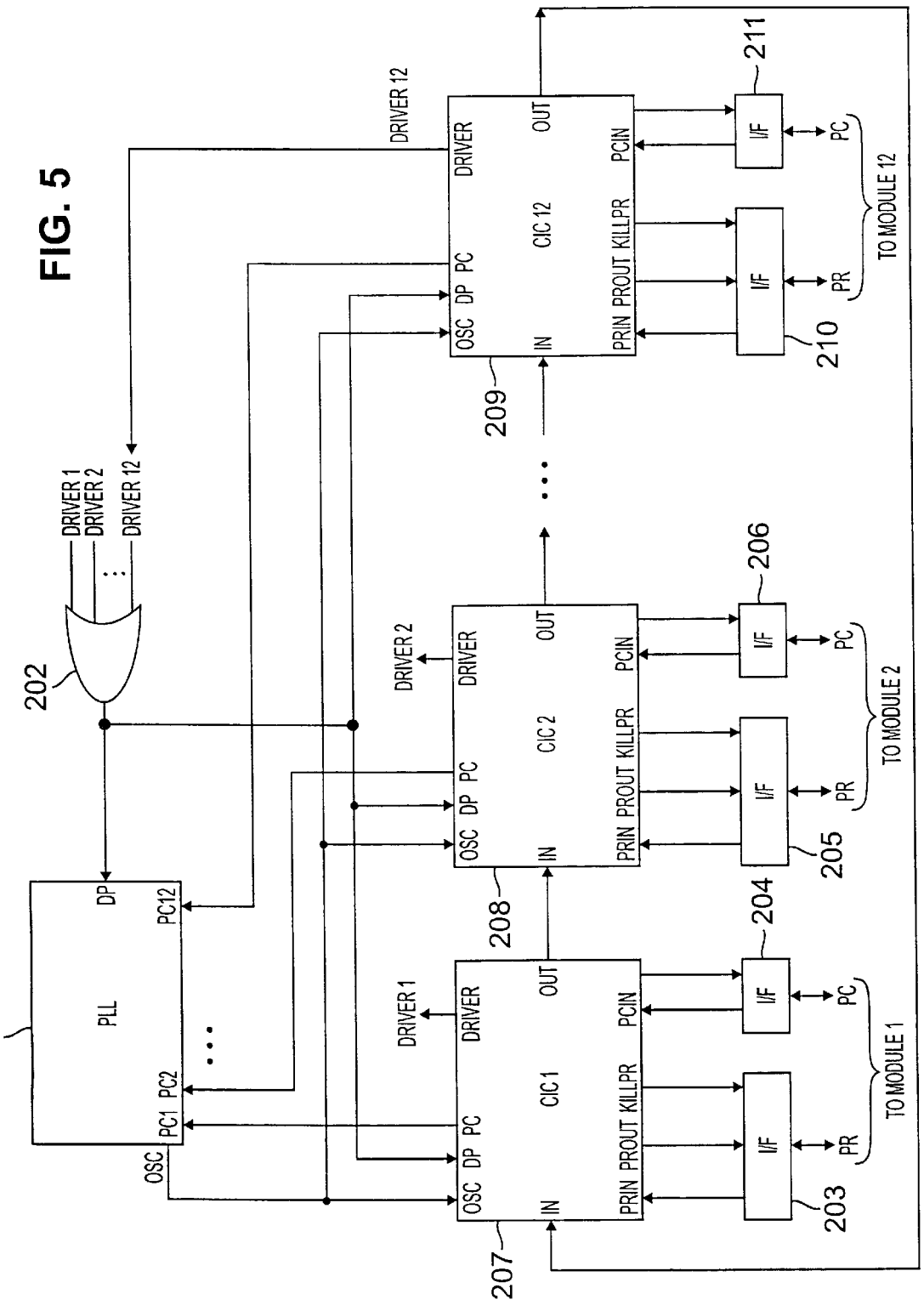
FIG. 5 is a schematic block diagram of a phased array controller for use with power converters in a power sharing array.

The operation of the phase synchronized power sharing array and the PAC 200 will be described in greater detail in connection with FIG. 5. The controller 200 is self-configuring and self-adjusting. This means that the controller 200 determines the number, N, of active converters in the array, determines which one of the N converters is the driver converter, adjusts the array operating frequency, Fsys, to N times the driver converter operating frequency, and phase staggers the booster conversion cycles, automatically. If one or more individual converters should fail during operation, the controller 200 will disconnect the failed converters from the phased array system, recount the number, N, of active converters in the phased array system, adjust the controller operating frequency, and phase stagger the conversion cycles of the remaining active converters. Any number of converters may be controlled in this manner, however, the controller of FIG. 5 is limited to arrays having a maximum of twelve converters per PAC.

The controller 200 synchronizes and phase staggers the converters using the driver pulse mono pulse handshaking on the PR lines. When the controller determines which converter in the array is the driver, it assigns driver status to that converter and booster status to all of the others. Driver status is awarded to the converter that operates at the highest frequency under given line and load conditions. Driver status is evaluated and awarded every operating cycle so the status of a particular converter is permitted to change.

A typical operating cycle begins with a driver pulse causing the controller to recognize the converter as the driver and award it driver status. All of the other converters are assigned booster status. The controller 200 outputs one mono pulse to each of the booster converters on its respective PR line during each operating cycle in the phase staggered manner described in connection with FIG. 3. The period between two driver pulses is defined as the operating cycle for the array. In other words, the period from one driver pulse from the current driver to the next driver pulse from either the old driver converter or a new driver converter is the operating cycle.

Ideally, the driver pulse and the mono pulses are spaced evenly throughout the operating cycle. After the last booster converter in the array receives a mono pulse, the controller 200 waits for the next driver pulse. Every other cycle, the controller adjusts its oscillator frequency as necessary to be N times the driver converter operating frequency. On cycles alternate to these adjustments, the controller resynchronizes its oscillator to the driver. With the receipt of the next driver pulse the operating cycle repeats. The next driver pulse may come from the same converter that was the driver in the preceding operating cycle or from a different converter. The driver pulse signals from all of the converter modules (DRIVER 1 . . . 12) are therefore OR'd by gate 202 (FIG. 5) to produce a master driver pulse signal ("DP") which is used by the controller 200. In the latter case, the new converter is recognized as the driver and awarded driver status and the cycle repeats as described above. Since the driver pulses establish the operating frequency of the controller 200 and the driver is the converter operating at the highest frequency, all of the converters in the array will be forced to operate at the highest converter operating frequency.

Referring to FIG. 5, a phase lock loop ("PLL") 201 supplies high frequency clock pulses on the OSC line to the twelve converter interface cells ("CIC"). The high frequency pulses are used by the CICs to generate the phase synchronized mono pulses for the individual converters. As described above, the PLL 201 must supply one pulse for each of the N converters in the phased array during each operating cycle and must therefore operate at N times the converter operating frequency, Fop. The PLL 201 receives a PC signal from each of the twelve CICs (PC1, PC2 . . . PC12) to determine the number of active converters in the array. Although numbered uniquely, each CIC is the same. One CIC is provided for each converter allowing arrays of up to a maximum of twelve converters per PAC using the controller 200 of FIG. 5.

The phase lock loop operation will be described in connection with FIG. 6. The phase lock loop 201 comprises a phase detector 221, a sampler 222, a voltage controlled oscillator ("VCO") 223 and a divider 226. The VCO 223 includes a voltage-to-current ("V/C") converter 224 and a current controlled oscillator 225. The V/C converter 224 includes four controlled current sources. The V/C converter 224 receives four CS signals from the divider 226 which activate the appropriate number of current sources. The V/C 224 also receives a control voltage from the sampler 222. The control voltage is used to set the current level for each of the activated current sources. Thus, the number of current sources turned on is determined by the number of active converters in the array and the current level in each of the activated current sources is determined by the control voltage. The variable number of current sources acts a scaling factor for setting the PLL frequency range while the variable input voltage acts as the fine adjustment to match the PLL oscillator frequency to N times the driver pulse frequency. The V/C 224 outputs a control current to the current controlled oscillator 225.

Figure 7:
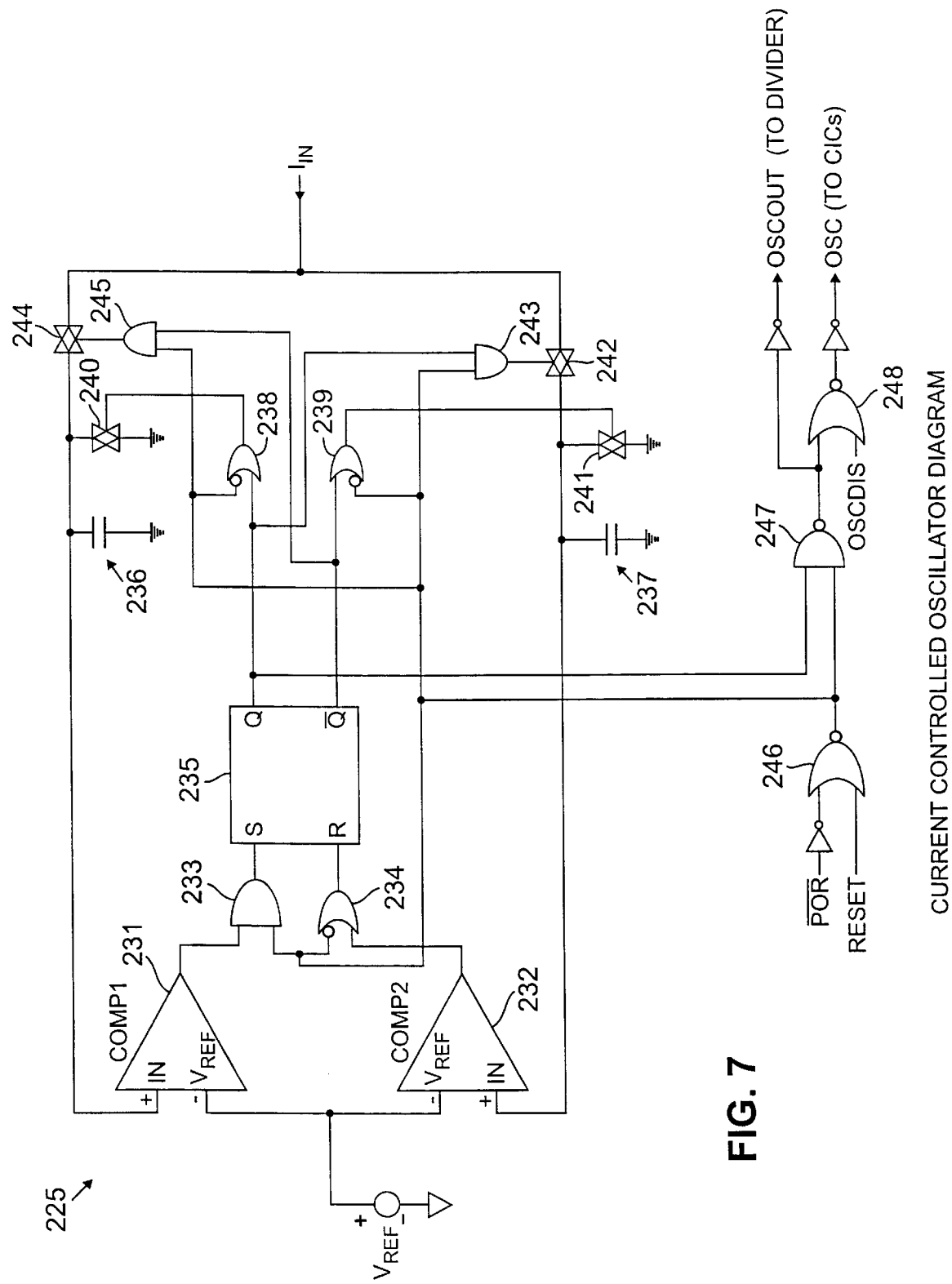
FIG. 7 is a schematic block diagram of a current controlled oscillator circuit.

Referring to FIG. 7 a schematic diagram of the current controlled oscillator is shown. Initially, the oscillator 225 is reset by a power on reset signal, POR, and is reset every second operating cycle by the RESET signal from the phase detector 221. When the reset signals are removed, the control current shown as Iin in FIG. 7, is allowed to charge capacitor 236 through switch 244. When the voltage across the capacitor reaches Vref, comparator 231 sets latch 235 which opens switch 244 and closes switch 240 thus discharging capacitor 236 and preventing the control current form reaching capacitor 236. Setting latch 235 also causes switches 241 and 242 to allow the control current to charge capacitor 237. When the voltage across capacitor 237 reaches Vref, comparator 232 resets latch 235 opening switch 242 and closing switch 241 thus causing capacitor 237 to discharge. Resetting latch 235 also closes switch 244 and opens switch 240 allowing the control current to charge capacitor 236 and thus repeating the process. It will be appreciated that the magnitude of the control current determines the frequency of operation of the oscillator.

Figure 6:
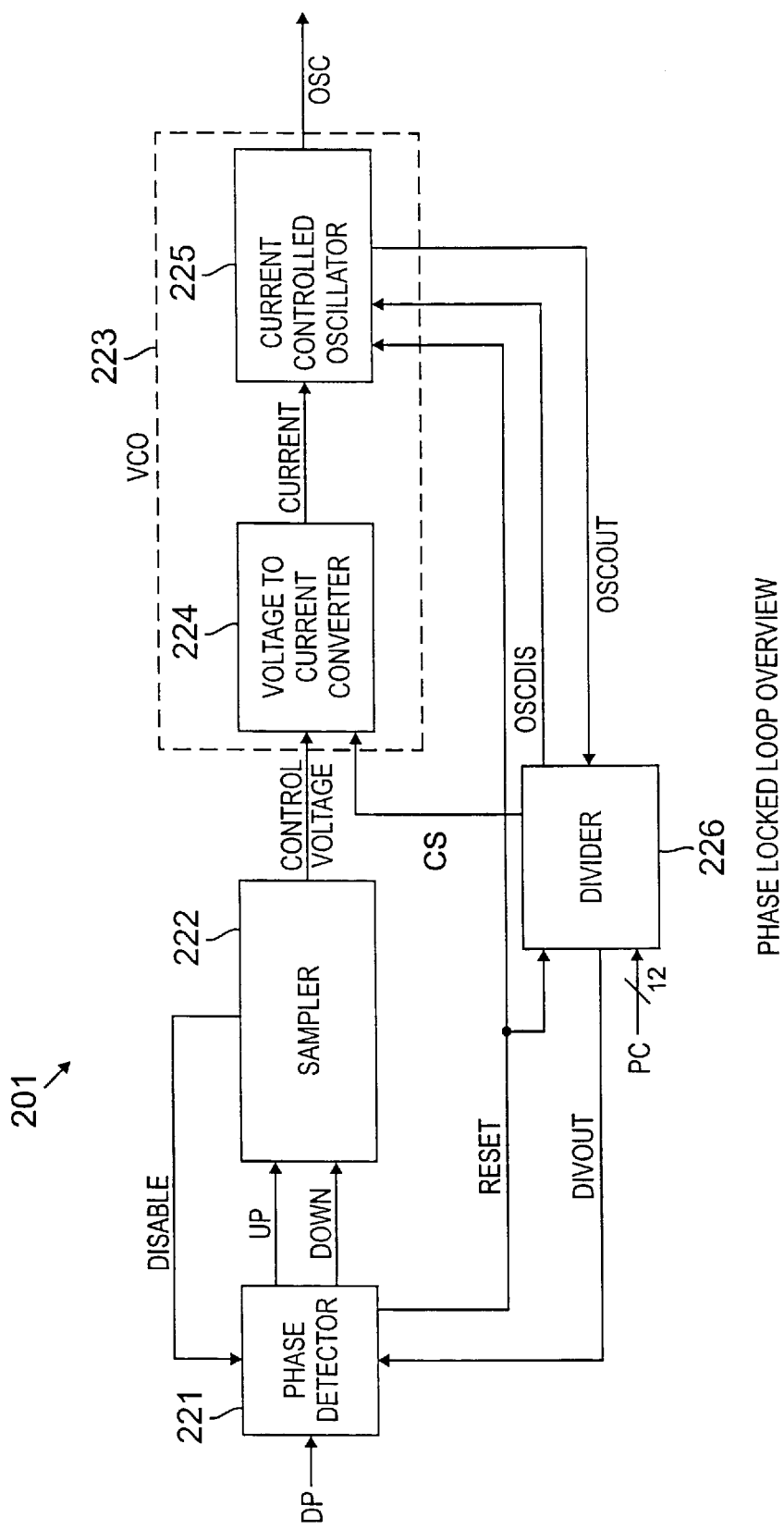
FIG. 6 is a schematic block diagram of a phase locked loop circuit.
Figure 10:
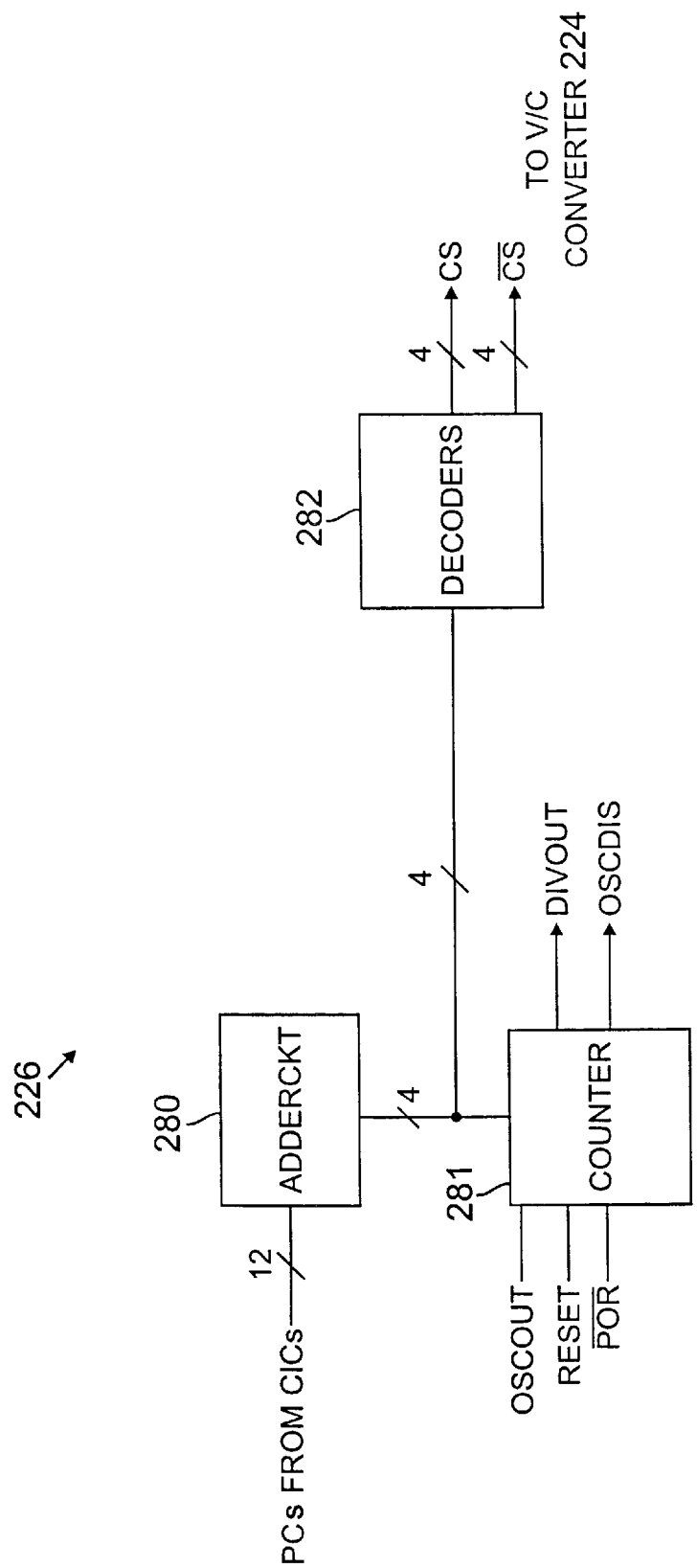
FIG. 10 is a schematic block diagram of a divider circuit.

Referring to FIGS. 6 and 10, the divider 226 includes a counter 281, an adder 280, and a decoder 282. The PC signals from the twelve CICs are input to the adder 280 which determines the number, N, of active converters in the array and outputs the binary signal to the counter 281 and the decoder 282. The counter 281 counts the number of clock pulses on the OSCOUT signal line and generates an oscillator disable signal, OSCDIS, which prevents the Nth pulse in an operating cycle from being sent to the CICs on the OSC line. Gate 248 (FIG. 7) inhibits the oscillator output signal to the CICs, OSC, but not the OSCOUT signal to the divider when the OSCDIS signal is received.

The divider also generates a signal DIVOUT which is used to adjust the frequency of the VCO 223. The DIVOUT signal is sent to the phase detector 221 (FIG. 6) for comparison with the next DP. The DIVOUT signal is coincident with the Nth pulse from the oscillator. The timing of the Nth pulse ideally corresponds to the next driver pulse from the driver converter. The counter 281 is reset by either the RESET signal or the power on reset signal, POR. As previously described, the decoder 282 sends the 4 CS signals to the V/C converter 224 to turn the current sources on or off depending upon the number, N, of active converters.

Figure 9:
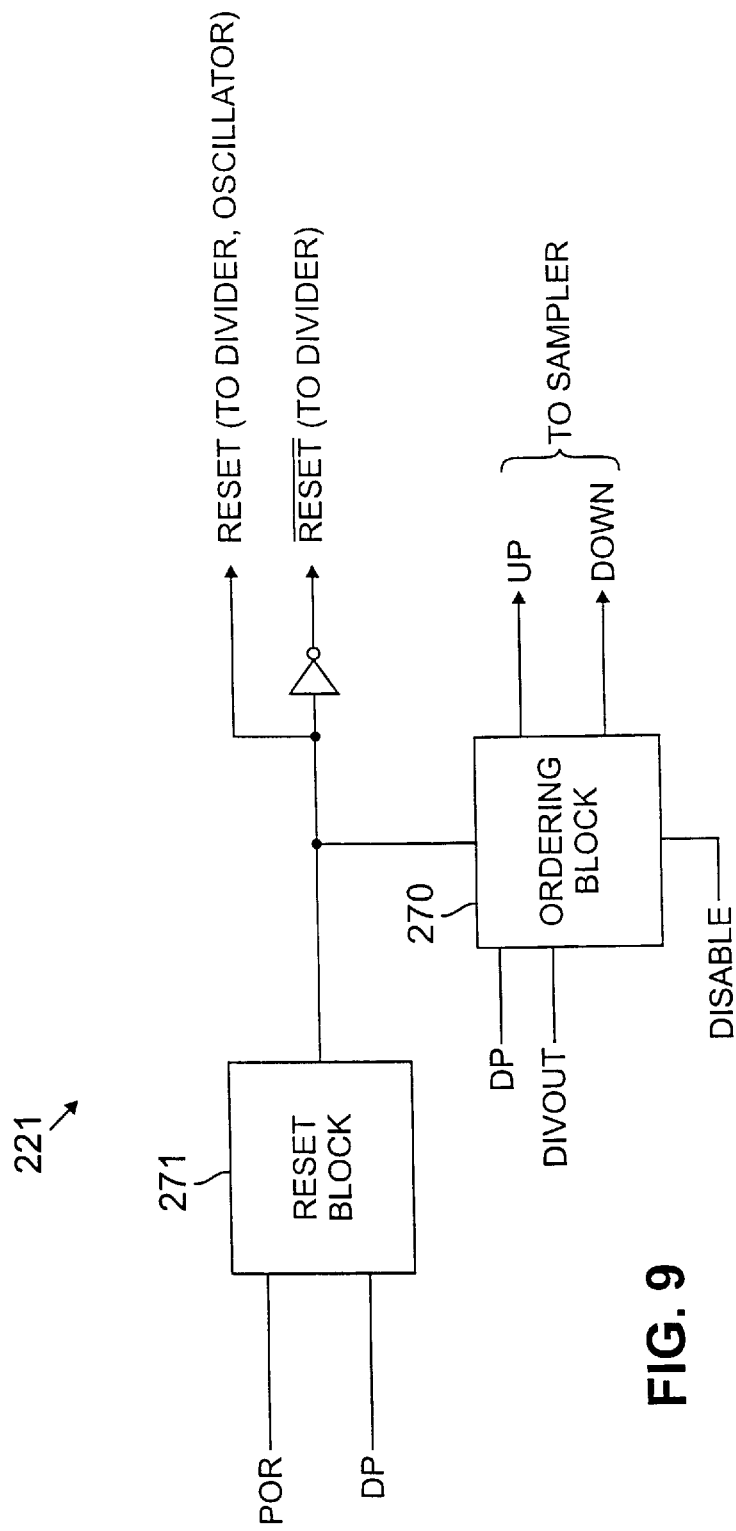
FIG. 9 is a schematic block diagram of a phase detector circuit.

Referring to FIG. 9, a block diagram of the phase detector 221 is shown having two blocks, a reset block 271 and an ordering block 270. The reset block 271 generates a RESET signal in response to every other DP signal. The RESET signal is used to reset the phase detector 221, divider 226 and oscillator 225 circuits. The ordering block 270 determines whether DP occurs before or after DIVOUT and generates the appropriate UP or DOWN signal for the sampler on operating cycles alternating with those when RESET is generated. If DIVOUT comes before DP, then the oscillator is running too fast and an UP signal is generated starting with the DIVOUT signal and ending with the DP signal.

Conversely, if DP comes before DIVOUT, the oscillator is running too slow and a DOWN signal is generated starting with the DP signal and ending with the DIVOUT signal. A DISABLE signal from the sampler 222 immediately inhibits both of the UP and DOWN signals regardless of the DP and DIVOUT signaling.

The UP and DOWN signals are used by the sampler 222 to adjust the control voltage. If the oscillator should slow down then the control voltage should be raised by an amount proportional to the time difference between DP and DIVOUT. The UP signal provides this function. Similarly, the DOWN signal lowers the control voltage by an amount proportional to the difference between DP and DIVOUT. To achieve an overdamped control, the maximum change in control voltage per cycle is limited to 25 mVolts.

The oscillator 223, phase detector 221, and divider 226 are reset on every second DP to resynchronize the PLL 201 with the DP signal. The RESET signal is generated by the phase detector 221. Phase detection is also performed on every second cycle but alternate from the reset cycles so that DIVOUT pulses occurring after the DP could be detected. If the PLL were reset with every DP, the occurrence of a DIVOUT signal after a DP would not be detected.

Figure 8:
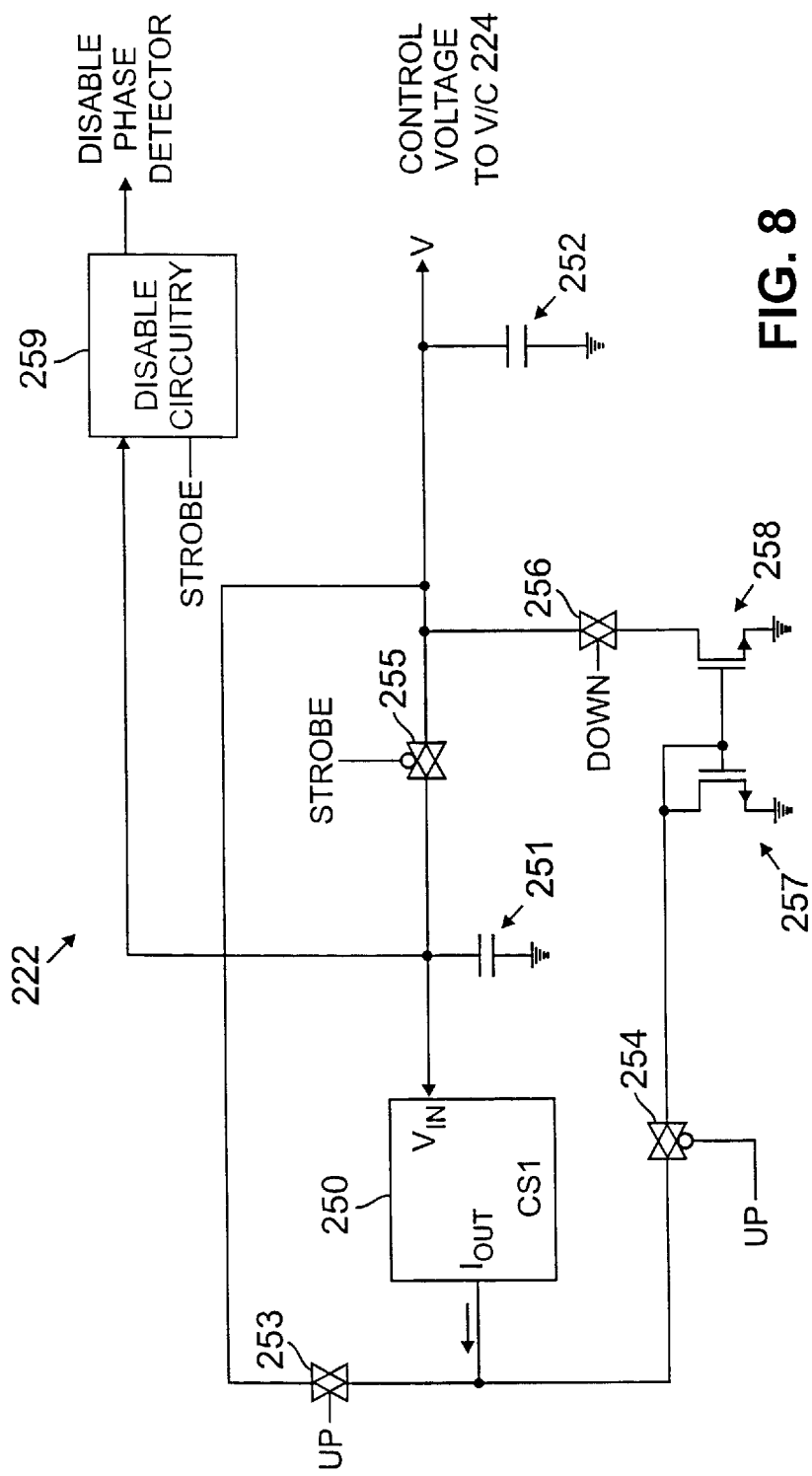
FIG. 8 is a schematic block diagram of a sampler circuit.

Referring to FIG. 8, a schematic diagram of the sampler 222 is shown. A pulsed STROBE signal generated every second operating cycle by the phase detector 221 is used to enable operation of the sampler circuitry. The STROBE signal briefly closes switch 255 allowing capacitor 251 to charge to the control voltage level. The voltage across capacitor 251 is fed to current source 250 and to the disable circuitry 259. The voltage across capacitor 250 sets the current level of controlled current source 250. The current from current source 250 is steered using the UP and DOWN signals from the phase detector. The UP and DOWN signals are mutually exclusive. In the DOWN mode, the DOWN signal closes switch 256 and switch 254 is closed because the UP signal is false. The current from source 250 will thus be sunk by current sink 257, mirrored by current sink 258, and cause capacitor 252 to be discharged for the length of time DOWN is high. In the UP mode, switch 253 is closed, switches 254 and 256 are open, and capacitor 252 is charged by the current from source 250. The voltage across capacitor 252 is output as the control voltage to the V/C converter 224. When capacitor 252 is not being charged or discharged, current from source 250 is sunk by current sink 257 through switch 254 which remains on while the UP signal is false.

The disable circuitry 259 includes a current source which is controlled by the voltage across capacitor 251 and mirrors current source 250 and a capacitor which is charged by the current source. The STROBE signal releases a ground potential clamp on the capacitor voltage allowing it to be charged by the current source. When the capacitor voltage reaches a threshold level corresponding to a voltage change of 25 mV across capacitor 252, a DISABLE signal is generated and sent to the phase detector 221. The DISABLE signal 221 inhibits the UP and DOWN signals thereby preventing capacitor 252 from charging or discharging any further. In this way, the maximum change in control voltage is limited to 25 mV per phase detection cycle (per two operating cycles) resulting in an overdamped system.

Referring back to FIG. 5, only three representative CICs 207, 208, 209 of the twelve are actually shown. The twelve CICs have their inputs and outputs daisy chained together as shown schematically in FIG. 5. Each CIC has an input, IN, connected to the output, OUT, of the previous adjacent cell and its OUT connected to the IN of the next adjacent cell to form a ring.

Each CIC communicates with its associated converter through an interface ("I/F") block, for example interface blocks 203 and 204 respectively provide bidirectional communication on the PR and PC signal lines between CIC 207 and its associated converter module. A driver pulse may be received from the converter as a PRIN signal and a mono pulse may be sent to the converter as generated by the PR I/F block via the PROUT signal. A mono pulse sent on the PROUT line is fedback to the CIC on the PRIN input via the PR I/F block. The KILLPR signal prevents any pulses from being sent to or received from the converter. An approximately 6 Volt level is presented to I/F block 204 by an active converter on its PC signal line. The PCIN signal thus indicates to the CIC that an active converter module is connected. An active low system reset signal is routed through the watchdog circuit and sent to the PC I/F block to pull the PC line low, thus disabling the converter as described more fully below.

Figure 11:
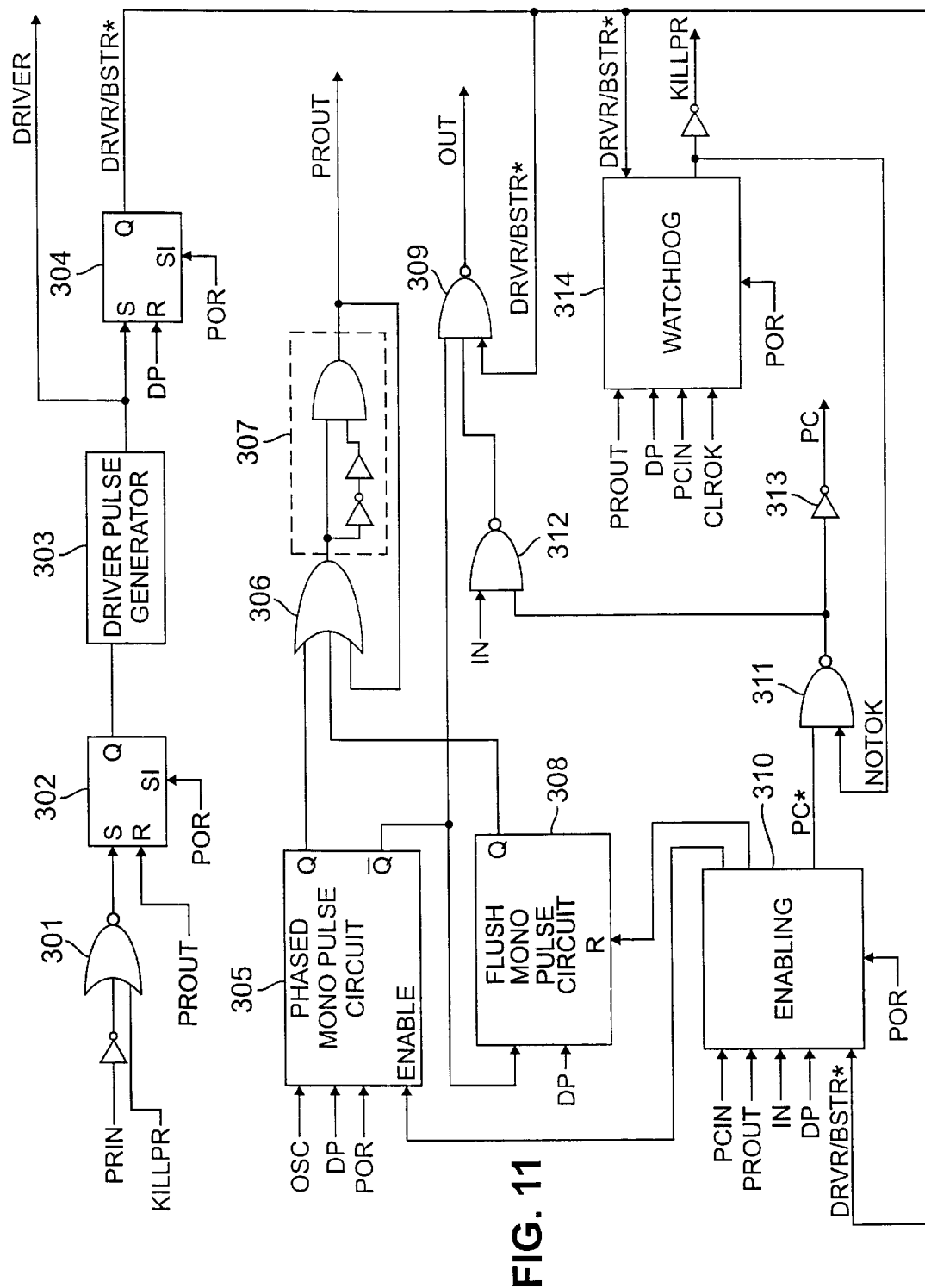
FIG. 11 is a schematic block diagram of a converter interface cell circuit.

Referring to FIG. 11, a schematic block diagram of one converter-interface-cell, CIC, 300 is shown. A driver pulse circuit comprises gate 301, latch 302, generator 303, and latch 304. A phased mono pulse circuit includes circuitry 305 and gates 306 and 307. A flush mono pulse circuit includes circuitry 308 and gates 306 and 307. Enabling circuitry includes block 310 and gates 311, 312, and 309.

The enabling circuitry determines whether the associated converter is active by monitoring the PCIN signal line every cycle. The PC I/F block (for example PC I/F block 204 in FIG. 5) sends the PCIN signal to the enabling circuit 310. A high PCIN signal, indicating that the converter is active, causes the enabling circuit 310 to provide a PC signal to the divider circuit 226 in the PLL 201. As discussed previously, the PC signal causes the converter to be counted as active in the phased array and contributes to setting the PLL frequency. The enabling circuit 310 also supplies signals to the phased mono pulse circuit and the flush mono pulse circuit to activate those circuits. If the PCIN signal is low, gate 312 allows signals on the IN line to pass directly to the OUT line making the CIC transparent to the remainder of the PAC.

Each CIC may function as a driver or as a booster, but only one CIC may be a driver in any one operating cycle. A driver pulse received on the PRIN line causes the driver pulse circuit to send a single DRIVER pulse signal to OR gate 202. Since the mono pulses from PROUT are fedback to the PRIN input, the driver pulse circuits 302 and 303 require two pulses on the PRIN input between DPs to recognize the converter as a driver. Latch 302 is reset by a mono pulse output on the PROUT line. The master driver pulse signal, DP, is sent to all of the CICs as shown in FIG. 5. Using latch 304, CIC 300 generates an internal DRVR/BSTR* signal which indicates whether the cell is a driver or a booster, i.e., whether its associated converter is the driver in the array or not.

When the DRVR/BSTR* signal is high, the cell is configured as a driver. The DRVR/BSTR* signal is input to the enabling circuit 310 which resets the flush mono pulse circuit 308 and disables the phased mono pulse circuit 305. This prevents the driver converter's associated CIC from generating any mono pulses. When the CIC is a driver, the DRVR/BSTR* signal forces gate 309 to send a high OUT signal to the next adjacent CIC.

In the booster mode, the DRVR/BSTR* signal will be low. The enabling circuit 310 will enable the phased mono pulse circuit when the IN signal is high. After the phased mono pulse generator 305 is enabled, the next oscillator pulse on the OSC input will force the Q output to go high. The gates 306 and 307 produce a single pulse on the PROUT output to the PR I/F circuit (for example block 203 in FIG. 5) which in turn sends a mono pulse to the converter module on the PR line thus causing the converter to initiate a energy conversion cycle. The complement of the Q output of circuit 305 forces gate 309 to send a high OUT signal to the next adjacent CIC.

The flush mono pulse circuit is activated in the event that a DP signal occurs before a phased mono pulse signal is generated by the CIC 300. The complemented Q output of the phased mono pulse circuit 305 is high until a phased mono pulse is generated. If a master driver pulse signal, DP, is received before the complemented Q output goes low, the Q output of the flush mono pulse circuit 308 will go high causing gates 306 and 307 to generate a mono pulse. The mono pulse generated by the flush circuit will not be phased since it will be essentially coincident with the driver pulse. The flush circuit is provided to ensure that all converters receive one mono pulse during each operating cycle even under changing load conditions.

The mono pulses from gate 307 are input to enabling circuit 310. The enabling circuit 310 resets the flush circuit 308 in response to the mono pulse from either the phased or flush mono pulse circuit ensuring that only one mono pulse is produce by the CIC per operating cycle.

The OUT signal of a CIC goes high to indicate that it has produced a pulse for its associated converter. If the CIC is a driver cell, the OUT goes high after the driver pulse is received by the CIC. Since the CIC will not produce a phased mono pulse until a high signal is presented to its IN input, only one CIC produces a phased mono pulse per OSC pulse. (The exception is during a flush operation when more than one CIC may generate a flush mono pulse at the same time. Being triggered by the DP signal, the flush operation is asynchronous to the OSC signal.) It should be appreciated that the cascaded connection of the CICs using the IN and OUT signals to form a ring allows for arbitrary connection of the converter modules to the CICs where less than twelve converters are used. For example, in a three converter array, the converters may be connected to any three CICs such as CIC 1, CIC 2, and CIC 3 or CIC 2, CIC 5, and CIC 11. The controller 200 will automatically detect the active converters and appropriately configure the array. Each CIC 300 connected to an active converter will produce exactly one phased or one flush mono pulse in each operating cycle.

A watchdog circuit 314 in FIG. 11, monitors the status of the CIC 300 to determine whether any of the four fault conditions has occurred. The watchdog circuit disables the CIC using the NOTOK and KILLPR signals if it detects any of the fault conditions. The KILLPR signal prevents gate 301 from passing any driver pulses to the driver circuit and prevents the PR I/F circuit from sending any mono pulses to the converter. The NOTOK signal inhibits the PC signal by blocking gate 311. The PC signal will not be counted by the PLL thus causing the PLL circuitry to behave as if there was one less converter in the array. Similarly, the NOTOK signal enables gate 312 which passes the IN signal directly to the OUT line making the CIC transparent to the remainder of the controller circuitry.

The NOTOK signal may also be used as a status signal to indicate the whether the associated module is functioning properly. For example, the NOTOK signal may be used to sink current for an LED which will be illuminated when the converter is operating properly and is part of the phased array. In the event of a fault, the converter is removed from the phased array and the indicator is no longer illuminated because the NOTOK signal goes high. The NOTOK signal may be pulled low momentarily by an external circuit to clear the watchdog fault removing the NOTOK signal and thus allowing the converter to reconnect to the phased array.

The watchdog circuit 314 detects the following mono pulse faults: (1,2) two mono pulses generated between DPs in either the driver or booster mode, (3) no mono pulses generated between DPs in two successive operating cycles in the booster mode, and (4) one mono pulse generated between DPs in two successive operating cycles in the driver mode.

The first two faults indicate that the CIC is generating too many mono pulses. If the converter is a driver, the CIC should not be generating any mono pulses. If it is a booster, only one mono pulse per operating cycle should be generated, therefore, two mono pulses between DPs is a fault. A flush mono pulse presents a special condition in which the flush pulse is generated in response to receipt of a DP. The flush pulse belongs to the operating cycle from before the DP that triggered it. The next mono pulse belongs to the cycle of the DP that triggered the flush. From the perspective of the watchdog circuit, the sequence would appear as DP, flush pulse (belonging to the cycle before the DP that triggered the flush), mono pulse (belonging to the current cycle). This is not an illegal sequence but there are two mono pulses between DPs. A delayed DP signal is therefore used to avoid an erroneous fault trigger during a flush.

The third fault condition, indicates that the CIC is not generating any mono pulses while the converter is in the booster mode. Two successive cycles are required to trigger the fault to allow a booster converter to become a driver. During the transition from booster to driver, the booster converter may generate a driver pulse before it receives a mono pulse. In this case, there will not have been a mono pulse between DPs in the transition cycle. However, there should never be two successive operating cycles in which there is no mono pulse between DPs in the booster mode.

The fourth fault condition addresses the situation that a CIC in the driver mode should not be generating any mono pulses. In the transition from driver mode to booster mode, a CIC in the driver mode may generate a mono pulse in response to a driver pulse from another CIC, the mono pulse will have come between two DPs before the watchdog receives the change in driver status. Therefore, the condition is a fault only after two operating cycles. When any fault condition is detected by the watchdog circuit, the NOTOK signal goes high.

A Vcc circuit (not shown) may provide power to the circuitry of controller 200 either from an external source or the power may be derived from the individual converter PC pins. In the latter case, the PC pins may be diode OR'd to feed the Vcc circuits. The PC pin power case is valid for configurations having up to N=3 converters. For N>3 converters, system power requirements dictate the need for an external regulator.

Figure 12A:
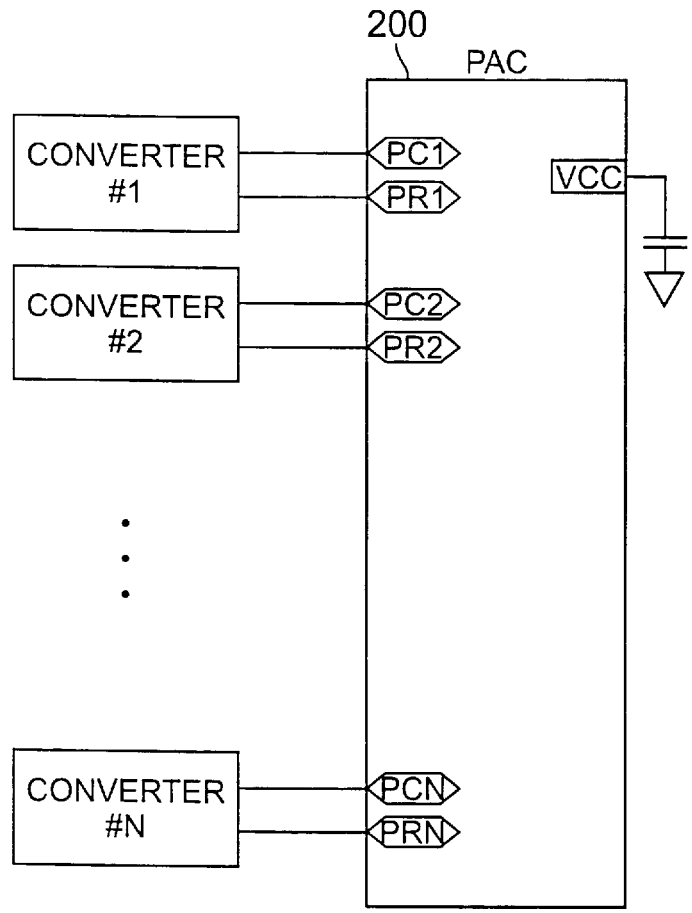
FIG. 12 (A–C) shows three configurations for connecting the controller to achieve various degrees of fault toleration.
Figure 12B:
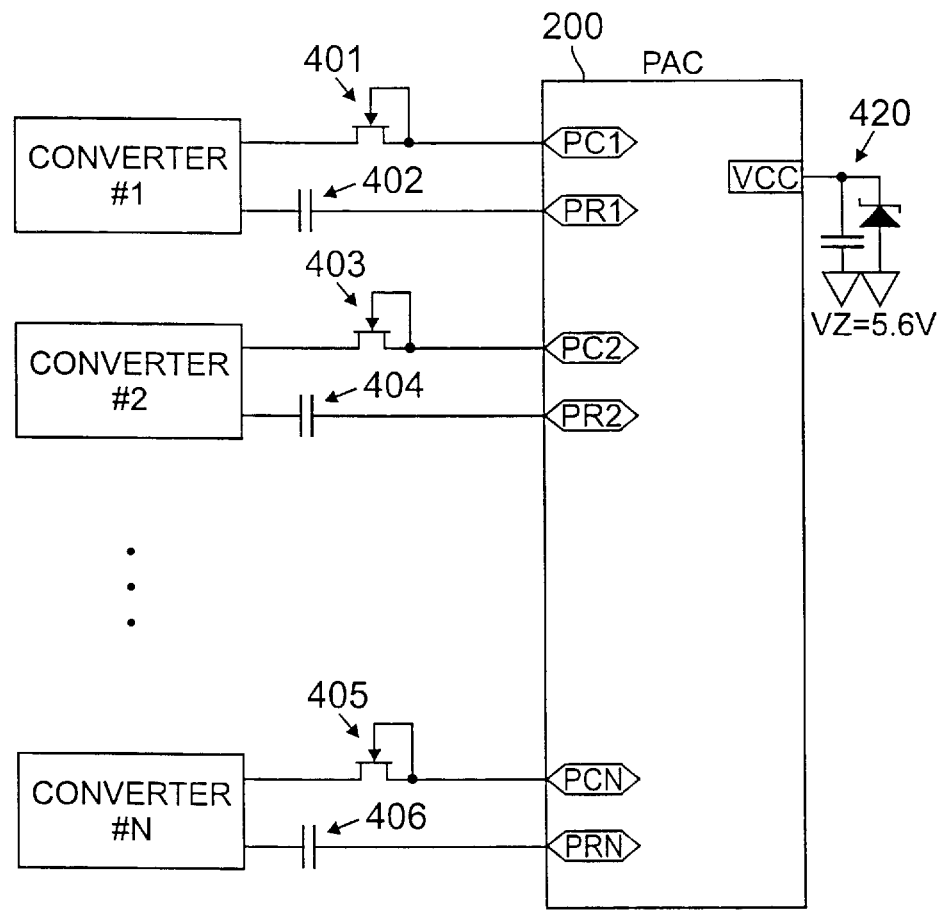
Figure 12C:
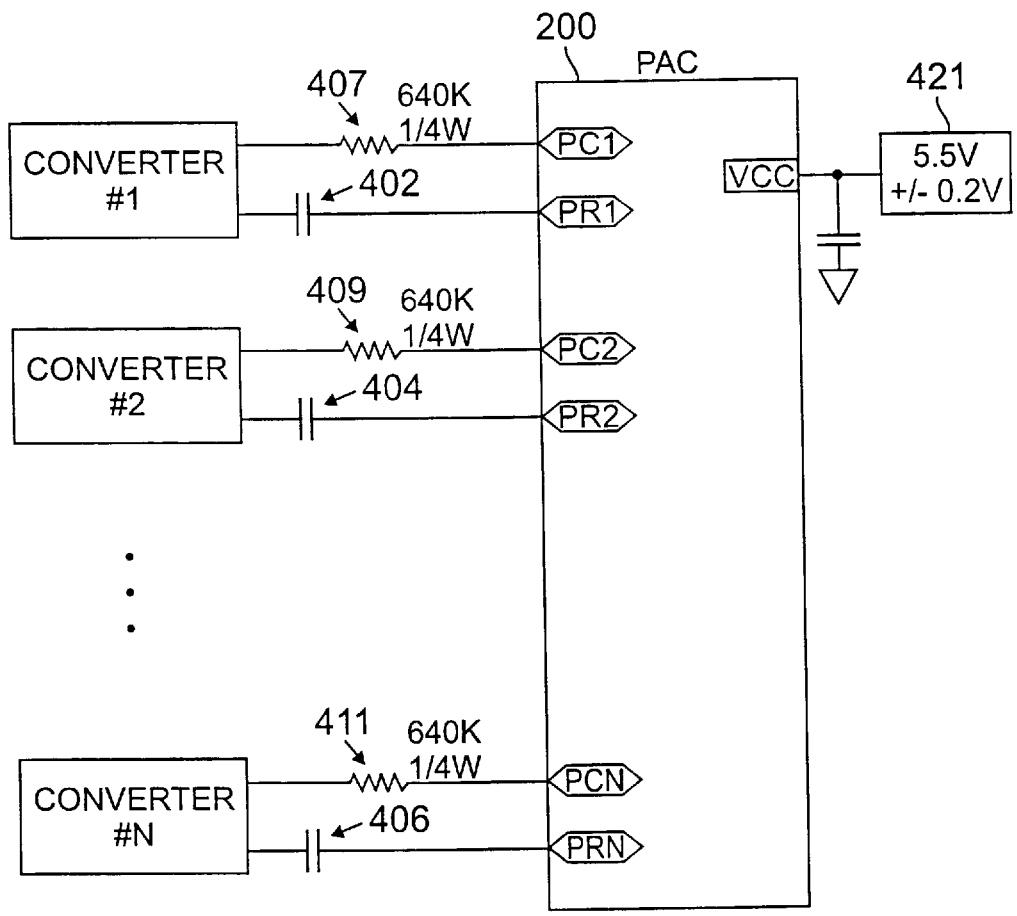

Referring to FIG. 12, the controller 200 may be connected for operation in any of the following modes: (A) non-fault tolerant, (B) non-fault tolerant limited destruction, and (C) fault tolerant. In configuration A, the PR and PC pins of the converter modules are connected directly to the PR and PC terminals of the controller 200. If N is less than or equal to three, the converters may power the PAC directly without an external regulator. A short circuit between either of these terminals and the converter input voltage will subject the controller 200 to very high voltages thus damaging or destroying the controller circuitry. A single fault at either the PAC Vcc or reset terminal will shut down all of the converters in the array. For these reasons, this connection scheme is considered non-fault tolerant.

In configuration B, JFET diodes are used to limit the current to the PAC on the PC lines and capacitors are used to AC couple the PR lines. As in configuration A, if N is less than or equal to three, the converters may power the PAC directly without an external regulator. The current limiting diode and blocking capacitors will limit or eliminate the damage due to a short on the converter module side of the PR or PC lines. However, a fault at the PAC Vcc or reset terminal will still shut down all of the converter modules. The PC outputs of the converter modules are current limited therefore when the PAC pulls the PC lines low the converter PC terminals will also go low shutting down the modules. For these reasons, this connection scheme is considered a non-fault tolerant but limited destruction configuration.

Finally, in configuration C, the PC terminals of the modules may be connected to the controller via a resistance. The resistance is chosen to be large enough, for example 640K Ohms, so that a short to the input voltage will not damage the PAC 200. The high valued resistance limits the role of the PC lines to sensing whether the converter is operating. An external power source and regulator are required to power the PAC in this configuration. However, the PAC will be incapable of disabling the converters thus a fault at either of the PAC reset or Vcc terminals will not disable the converters. The converters will be removed from the phased array and allowed to run asynchronously instead. DC blocking capacitors are also used on the PR lines. The capacitors should have a voltage rating sufficient to withstand the full input voltage to the module.

Other embodiments are within the scope of the following claims.

What is claimed is:

1. A power sharing converter array comprising
   a plurality of quantized switching power converters having inputs connected to a power source and having outputs connected to a load;
   control circuitry including a timing circuit, a status circuit, and output circuitry;
   said timing circuit having inputs connected to receive converter operating cycle information from said converters;
   said status circuit having inputs connected to receive status signals from said converters and an output connected to said timing circuit for providing a tally of converters meeting predetermined criteria;
   said output circuitry connected to said timing circuitry for sending synchronizing signals to said converters;
   said control circuitry automatically determining the number, N, of converters in said array, and generating said synchronizing signals for operating said converters in a phase-staggered synchronized array.

2. The converter array of claim 1 wherein: the timing circuit determines the highest frequency of said converter operating cycles and generates a signal having a frequency approximately N times said highest frequency.

3. The converter array of claim 1 wherein said status circuit detects predetermined fault conditions and generates a signal to logically remove one or more of said converters from said phased-staggered synchronous array.

4. The converter array of claim 3 wherein said status circuit automatically adjusts said number, N, of converters in response to one or more of said converters being logically removed from said array.

5. The converter array of claim 4 wherein said status circuit ensures that a predetermined number of booster pulses are produced per booster per operating cycle.

6. The converter array of claim 1 wherein said timing circuit receives driver pulses from said converters and determines which one of said converters is operating at the highest frequency and awards driver status to one converter and awards booster status to the remaining converters in said array.

7. The converter array of claim 6 wherein said control circuit operates at a system frequency of approximately N times the frequency of driver pulses from said converters.

8. A control circuit for controlling power converters connected in a load sharing array, comprising:
   a timing circuit having inputs connected to receive converter operating cycle information from said converters;
   a status circuit having inputs connected to receive status signals from said converters and an output connected to said timing circuit for providing a tally of converters meeting predetermined criteria;
   output circuitry connected to said timing circuitry for sending synchronizing signals to said converters; said control circuitry automatically determining the number, N, of converters in said array, generating said synchronizing signals for operating said converters in a phase-staggered synchronized array.

9. The control circuit of claim 8 wherein: the timing circuit determines the highest frequency of said converter operating cycles and generates a signal having a frequency approximately N times said highest frequency.

10. The control circuit of claim 9 wherein said status circuit detects predetermined fault conditions and generates a signal to logically remove one or more of said converters from said phased-staggered synchronous array.

11. The control circuit of claim 10 wherein said status circuit automatically adjusts said number, N, of converters in response to one or more of said converters being logically removed from said array.

12. The control circuit of claim 11 wherein said status circuit ensures that a predetermined number of booster pulses are produced per booster per operating cycle.

13. The control circuit of claim 8 wherein said timing circuit receives driver pulses from said converters and determines which one of said converters is operating at the highest frequency and awards driver status to one converter and awards booster status to the remaining converters in said array.

14. The control circuit of claim 13 wherein said control circuit operates at a system frequency of approximately N times the frequency of driver pulses from said converters.

15. A method of operating power converters in a power sharing array comprising: receiving driver pulses from said converters; determining the number, N, of converters in said array; determining which one converter in said array is operating at the highest frequency, awarding driver converter status to said one converter, and awarding booster status to all converters in said array other than said driver converter; generating timing signals having a frequency of approximately N times the frequency of driver pulses; generating synchronization signals for said booster converters such that said booster converters are phase-staggered and synchronized with said driver converter.

16. The method of claim 15 wherein said determining the number process is carried out periodically to detect changes in said number N of converters in the array.

17. The method of claim 15 wherein said determining which one converter process is carried out periodically to allow said converters to change between driver and booster status.

18. The method of claim 15 further comprising monitoring said synchronization signals to ensure that a predetermined number of signals are produced per booster converter per operating cycle.

* * * * *